L. STEVENS.
PROCESS FOR THE RECOVERY OF MATERIAL IN THE FORM OF DUST FROM ROTARY CEMENT KILN GASES.
APPLICATION FILED AUG. 19, 1915.
1,214,725.
Patented Feb. 6, 1917.
2 SHEETS—SHEET 1.
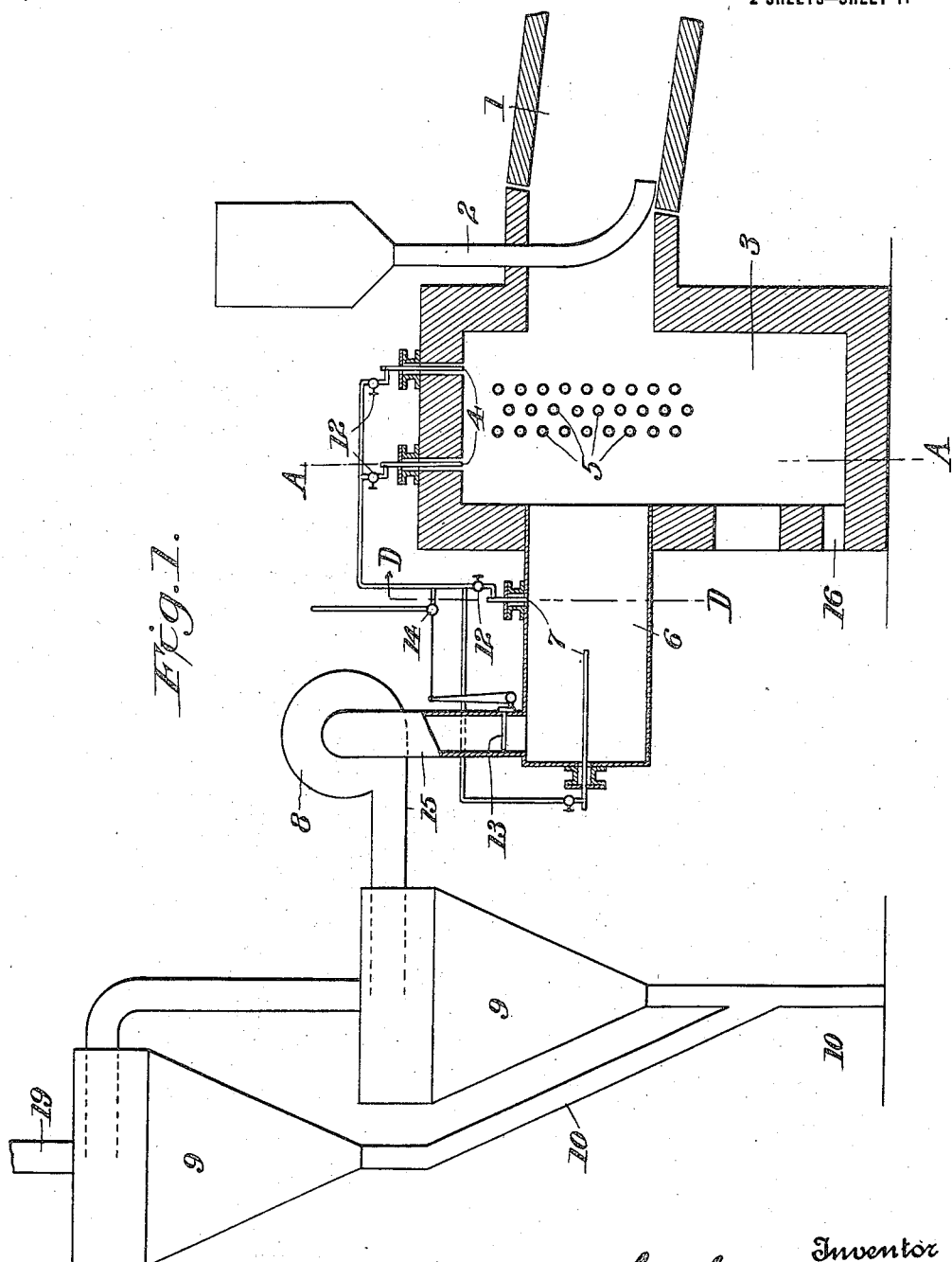

L. STEVENS.
PROCESS FOR THE RECOVERY OF MATERIAL IN THE FORM OF DUST FROM ROTARY CEMENT KILN GASES.
APPLICATION FILED AUG. 19, 1915.
1,214,725.
Patented Feb. 6, 1917.
2 SHEETS—SHEET 2.
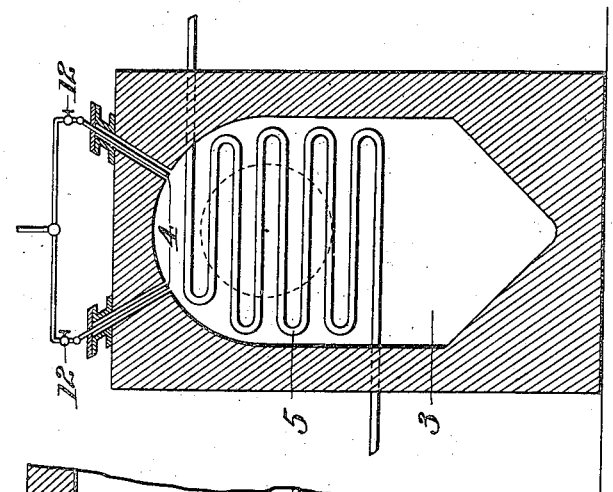
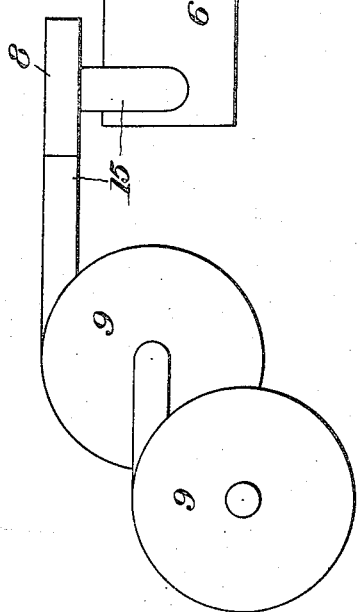
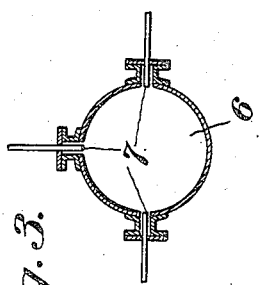

UNITED STATES PATENT OFFICE.

LEVI STEVENS, OF ALPENA, MICHIGAN, ASSIGNOR TO JERMIN AND STEVENS, OF ALPENA, MICHIGAN, A FIRM COMPOSED OF FRANK JERMIN AND LEVI STEVENS.

PROCESS FOR THE RECOVERY OF MATERIAL IN THE FORM OF DUST FROM ROTARY-CEMENT-KILN GASES.

1,214,725.     Specification of Letters Patent.     Patented Feb. 6, 1917.

Application filed August 19, 1915. Serial No. 46,334.

*To all whom it may concern:*

Be it known that I, LEVI STEVENS, a citizen of the United States, residing at Alpena, in the county of Alpena and State of Michigan, have invented certain new and useful Improvements in Processes for the Recovery of Material in the Form of Dust from Rotary-Cement-Kiln Gases, of which the following is a specification.

This invention relates to a process of and apparatus for the recovery of material in the form of dust carried by the products of combustion and other gases from rotary cement kilns.

The objects of my invention are to reduce the temperature of the gases from the cement kiln sufficiently to permit them to be handled by the exhaust fans and dust-separators, and to recover the dust and suspended cement particles in a dry condition suitable for future or immediate use, and to discharge the products of combustion and other gases from the cement kiln practically free from suspended matter.

In the accompanying drawings,—Figure 1 is a vertical longitudinal section through the rear end of a rotary cement kiln and cooling chamber, showing the spray-pipes and a cooling coil, and also showing the connections to the exhaust fan and the dust-separators; Fig. 2 is a vertical cross-section, on the line A—A of Fig. 1; Fig. 3 is a vertical cross-section on the line D—D of Fig. 1; Fig. 4 is a plan view of a part of the hurricane chamber, cooling chamber, exhaust fan, and dust-separators.

In Fig. 1, the cement kiln 1 is supplied with crushed rock, etc., from the feed 2 in the usual manner; the products of combustion, and other gases carrying the dust and suspended particles of cement from the kiln passing from the cement kiln into a chamber 3 which I call the hurricane chamber, wherein they are sprayed by and commingled with a regulated supply of water, as a spray or mist, from the suitably located spray-pipes, atomizers, or equivalent means 4, 4, the water spraying the gases as they leave the kiln.

5, 5 are cooling pipes, carrying a current of air or water, by which the gases are additionally cooled. These pipes 5, 5 are used only when a supply of hot air or water is desired, and are not the principal means by which the dust-carrying gases are cooled. After leaving the hurricane chamber 3, the gases pass into the cooling chamber 6 in which they are further sprayed by regulated quantities of water from the suitably located spray-pipes 7, 7, (Figs. 1 and 3), all the water so supplied being converted into steam and passing out with the gases, the temperature of the kiln gases being thereby reduced. The quantity of water supplied to the spray-pipes 4, 4 and 7, 7 is regulated, preferably by automatic means, as described hereafter, so that the temperature of the kiln gases and the dust shall not fall below that of the boiling-point of water. The cooled dust-laden gases are now drawn from the cooling chamber by the exhaust fan 8, from which they pass into the dust separators 9, 9 of which two are shown, although more may be used if found necessary. In the dust-separators, the dust and particles of cement separate in a dry condition from the cooled gases, the products of combustion, gases, and steam passing out through the stack 19, while the precipitated dry dust passes through the pipes 10, 10 to suitable storage chambers.

The supply of water to the spray-pipes 4, 4 and 7, 7 may be independently controlled by valves 12, which permit the removal of any sprayer for repairs, etc. During operation the supply is however preferably controlled by the automatic thermostat regulator 13, which operates the main supply valve 14, controlling all the pipes, increasing the quantity of water as the temperature of the gases increases, and decreasing it when the temperature decreases; the thermostat being preferably located in the connecting pipe 15 between the cooling chamber and the dust-separators. The temperature of the cooled dust-laden gases should be low enough to be passed with safety through the exhaust fan and dust-separators, and still be above the boiling-point of water, in order that all water injected shall be converted into steam and be carried off with the products of combustion, etc., and leave the dust physically dry. By "dry condition" is meant that the dust is recovered in a loose or pulverulent form, free from such proportion of moisture as might cause it to set or harden.

The suction fan is placed in the connecting pipe 15 between the cooler and the dust separator in order that only cooled gases shall come in contact therewith; otherwise, the hot gases would readily oxidize the same and render it inoperative.

When cooling-pipes 5, 5 are used, they are sufficiently separated so as not to impair the "draft" of the apparatus, and not to collect masses of separated dust, etc. Any dust or cement particles that settle in the hurricane chamber are removed through the outlets 16.

I claim:—

1. The process of treating cement-kiln gases carrying suspended matter, which consists in commingling water therewith, converting said water into vapor by the heat of the gases, passing the cooled gases through a dust-separator, and precipitating the suspended matter from said gases in a dry condition.

2. The process of treating cement-kiln gases carrying suspended matter, which consists in commingling a regulated supply of water therewith, converting said water into vapor by the heat of the gases, passing the cooled gases through a dust-separator and precipitating the suspended matter from said gases in a dry condition.

3. The process of treating cement-kiln gases carrying suspended matter, which consists in commingling a regulated supply of water therewith, automatically increasing the water-supply as the temperature of the gases increases, and automatically decreasing it as the temperature decreases, converting the water into vapor by the heat of the gases, passing the cooled gases through a dust-separator and precipitating the suspended matter in a dry condition.

4. The process of treating cement-kiln gases carrying suspended matter, which consists in commingling with said gases upon their exit from the kiln a regulated supply of water, converting said water into vapor by the heat of the gases and thereby cooling the gases, automatically increasing the water-supply as the temperature of the gases increases, and decreasing the supply as the temperature decreases, passing the cooled gases through a dust-separator and precipitating the suspended matter in a dry condition.

5. The process of treating cement-kiln gases carrying suspended matter, which consists in commingling therewith a regulated supply of water as the gases issue from the kiln, converting the water into vapor by the heat of the gases and controlling the water-supply in accordance with variations in temperature of the gases.

6. The process of treating cement-kiln gases carrying suspended matter, which consists in commingling therewith an automatically regulated supply of water as the gases issue from the kiln, converting the water into vapor by the heat of the gases and controlling the water-supply in accordance with variations in temperature of the gases.

7. The process of treating cement-kiln gases carrying suspended matter, which consists in commingling therewith an automatically regulated supply of water as the gases issue from the kiln, increasing the water-supply as the temperature of the gases increases, and decreasing the water-supply as the temperature of the gases decreases.

8. The process of treating cement-kiln gases carrying suspended matter, which consists in commingling therewith an automatically regulated supply of water as the gases issue from the kiln, increasing the water-supply as the temperature of the gases increases, and decreasing the water-supply as the temperature of the gases decreases, said water being converted into vapor by the heat of the gases, passing said cooled gases through a dust-separator, and discharging the gases at a temperature above the boiling-point of water.

9. The process of treating cement-kiln gases carrying suspended matter, which consists in commingling with said gases upon their exit from the kiln a regulated supply of water, converting said water into vapor by the heat of the gases and thereby cooling the gases, automatically increasing the water-supply as the temperature of the gases increases and decreasing the supply as the temperature decreases, passing the cooled gases through a dust-separator and precipitating the suspended matter in a dry condition, and expelling the gases from said dust-separator at a temperature above the boiling-point of water.

In testimony whereof I affix my signature in presence of two witnesses.

LEVI STEVENS.

Witnesses:
FRANK JERMIN,
RALPH C. WEST.